Patented May 28, 1940

2,202,350

UNITED STATES PATENT OFFICE 2,202,350

GREEN TRISAZO DYESTUFFS AND A PROCESS FOR THEIR MANUFACTURE

Heinrich Lier, Basel, Switzerland, assignor to the firm Chemical Works, formerly Sandoz, Basel, Switzerland No Drawing. Application February 24, 1939, Serial No. 258,330. In Switzerland March 5, 1938

6 Claims. (Cl. 260—171)

The present invention relates to new green trisazo dyestuffs suitable for dyeing leather in fast green shades and to a process for their manufacture.

Applicant has found that new valuable green trisazo dyestuffs may be obtained by coupling in an acid medium a diazo compound deriving from an amine of the benzene and naphthalene series with a sulphonated 1.8-aminonaphthol and combining the monoazo dyestuff thus obtained with a tetrazo compound deriving from benzene, naphthalene or diphenyl series in such a manner, that one of the diazo groups becomes combined with the monoazo dyestuff, the other diazo group being coupled with an acyl acetic acid arylide. The dyestuffs obtained in this manner are built up as it is shown by the following general formula

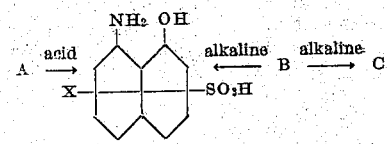

wherein A stands for a diazo compound deriving from an amine of the benzene and naphthalene series, B stands for a bivalent radical of the benzene, naphthalene and diphenyl series, C stands for an acyl acetic acid arylide and X stands for hydrogen or a sulphonic acid group.

As diazo compound A applicant uses diazotized aminobenzene- or aminonaphthalene mono- or -polysulphonic acids and their derivatives containing halogen, nitro, carboxy, alkoxy, aryloxy, amino, alkylamino, acylamino, sulfoylamino or sulphamido groups. Such suitable components are for instance the diazo compounds of the ortho-, meta- and para-aminobenzene sulphonic acids, aniline-2.5-disulphonic acid, p-toluidine-o-sulphonic acid, p-chloraniline-o-sulphonic acid, p-nitraniline-sulphonic acids, p-amidoacetanilide-o-sulphonic acid, naphthionic acid, amino-R-acid and similar compounds.

As tetrazo compound B the applicant uses tetrazotized diamines like tetrazotized benzidine, diphenyline, o-tolidine, m-tolidine, dianisidine, benzidine-sulphone, tetrazotized halogenated benzidines, mono- or disulphonic acids of the benzidines and similar compounds.

For the preparation of the new trisazo dyestuffs there can be used instead of the tetrazo compounds also monodiazotized diamines or diazotized nitranilines like meta- or paranitraniline and their sulphonic acids, or the respective acylaminoarylamines like acylaminoaniline, whereby the nitro- respectively the acylamino groups contained in these compounds are after coupling reduced to the amine group or saponified, whereby aminoazo dyestuffs will be obtained, which may be further diazotized and coupled with the acylacetic acid arylides.

As aminonaphtholsulphonic acid applicant preferably uses 1.8-aminonaphthol-3.6-disulphonic acid, 1.8-aminonaphthol-4.6-disulphonic acid, 1.8-aminonaphthol-4-sulphonic acid and similar sulphonated compounds.

As end component C applicant uses acylacetic acid arylides; especially the arylides of the acetoacetic acid such as acetoacetic acid anilide, -p-toluidide, -m-xylidide, o-chloranilide, -2.5 dichloranilide, -o-anisidide, -p-anisidide, -p-cresidide, -α-naphthylamide, diacetoacetylbenzidine and similar compounds.

The new green dyestuffs obtained as herein above described possess various constitution and solubility according to the selection of the components used for their manufacture.

In the dry state they are dark powders easily soluble in water with a yellowish green to a greenish blue coloration. They dye leather of different tanning in fast green level and brilliant shades. As compared to the known dyestuffs which contain instead of the acylacetic acidarylide as end component a phenol or a phenolcarboxylic acid, they possess a much better fastness to light and a better stability towards the action of acids and alkalies. The new dyestuffs possess further the property of dyeing leather which has been tanned with mineral or vegetable tanning agents in very level shades with a good penetration of the color and the dyeing baths are easily exhausted on addition of small quantities of acid. They can be used for through-dyeing or brush-dyeing, or dyeing by the spraying method of various sorts of leather and possess, when applied by these methods, valuable penetrating properties.

One object of the present invention is the process for the manufacture of green trisazo dyestuffs suitable for dyeing leather comprising the steps of first coupling in an acid medium a diazo compound deriving from an amine of the benzene and naphthalene series with a sulphonated 1.8-aminonaphthol combining the monoazo dyestuff thus obtained with an equimolecular quantity of a tetrazo compound deriving from an amine of the benzene, naphthalene and diphenyl series, and coupling the diazo-disazo dyestuff thus obtained with an acylacetic acid arylide.

Another object of the present invention are the new green trisazo dyestuffs, eminently suitable for dyeing leather, which respond to the general formula

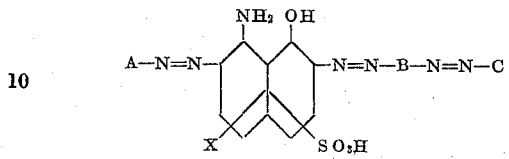

wherein A stands for a radical deriving from a diazo compound deriving from an amine of the benzene and napthalene series, B stands for a bivalent radical of the benzene, naphthalene and diphenyl series, C stands for an acylacetic acid arylide and X represents hydrogen and a sulphonic acid group.

*Example 1*

1 mol. of diazotized aminobenzene-2.5-disulphonic acid is coupled in weak mineral acid with 1 mol. of 1.8 aminonaphthol-3.6-disulphonic acid. By careful addition of some acid binding agent such as sodium bicarbonate, the complete coupling is rapidly reached. The weak mineral acid solution is then carefully made alkaline with sodium carbonate and a solution of 1 mol. tetrazo benzidine is slowly added thereto. When the tetrazo-benzidine has completely disappeared, an alkaline solution of 1 mol. acetoacetic acid anilide is added thereto, whereby the final coupling takes place very rapidly and the solution becomes colored intensively green.

The solution is then stirred during several hours, heated up to 60° C., carefully acidulated and the dyestuff carefully salted out. After filtration and drying the dyestuff is obtained in the form of a dark powder, which is easily soluble in water with an emerald green coloration. This dyestuff dyes leather which has been tanned with mineral or vegetable tanning agents in beautiful deep green shades, which possess a more brilliant shade as compared to the shade obtained with dyestuffs possessing phenols as end component.

The new dyestuff dyes for instance chrome suede leather in beautiful, level green shades, which are not cleared up on subsequent fluffing, due to the good penetration of the dyestuff.

The new dyestuff can also be used in a cold acidulated solution for brush-dyeing and spray-dyeing of leather, without giving a bronze-effect.

By using instead of the aminobenzene-2.5-disulphonic acid compounds such as sulphanilic acid or metanilic acid or aniline-o-sulphonic acid or p-toluidine-o-sulphonic acid, dyestuffs will be obtained which possess a similar shade, but a somewhat decreased solubility. Such dyestuffs are especially used in the cases, where less value is given on penetration, but where it is very important to obtain a level superficial dyeing of the leather.

A similar dyestuff will also be obtained when instead of tetrazobenzidine, tetrazodianisidine is used.

More difficultly soluble and somewhat bluer dyestuffs will be obtained by using as end component acetoacetic acid-o-chloranilide, -2.5-dichloranilide, -α-naphthylamide and similar compounds.

*Example 2*

1 mol. of diazotized sulphanilic acid is coupled in weak mineral acid solution with 1 mol. of 1.8-aminonaphthol-3.6-disulphonic acid and the monoazo dyestuff thus obtained combined with tetrazobenzidine and acetoacetic acid anilide in the manner described in Example 1.

The green dyestuff thus obtained dyes box leather in fast and level green shades.

*Example 3*

The disazodiazo dyestuff obtained as intermediate product in the manner described in Example 1 by combining 1 mol. of aniline-2.5-disulphonic acid with 1 mol. of 1.8-aminonaphthol-3.6-disulphonic acid and 1 mol. of tetrazobenzidine is coupled in alkaline medium with 1 mol. of acetoacetic acid-o-anisidide. The dyestuff thus obtained dyes leather in clearer green shades than the respective dyestuff containing as end component the acetoacetic acid anilide.

What I claim is:

1. The new green trisazo dyestuffs of the general formula

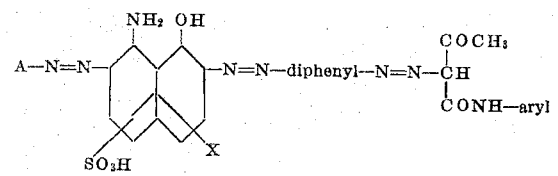

wherein A stands for a sulphonated radical deriving from a diazo compound deriving from an amine of the benzene and naphthalene series and X stands for one member of the group consisting of hydrogen and a sulphonic group, which dyestuffs are in the dry state dark powders, easily soluble in water with a yellowish green to greenish blue coloration and which dye vegetable and mineral tanned leather in fast green shades.

2. The new green trisazo dyestuffs of the general formula

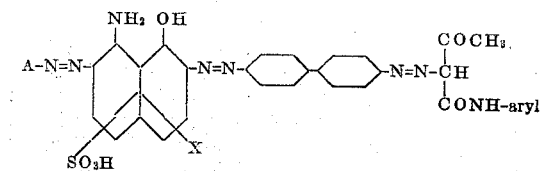

wherein A stands for a sulphonated radical deriving from a diazo compound deriving from an amine of the benzene and naphthalene series and X stands for a member of the group consisting of hydrogen and a sulphonic group, which dyestuffs are in the dry state dark powders, easily soluble in water with a yellowish green to greenish blue coloration and which dye vegetable and mineral tanned leather in fast green shades.

3. The new green trisazo dyestuffs of the general formula

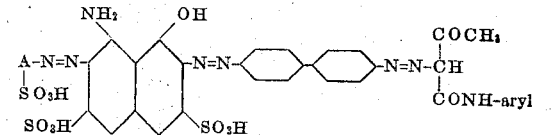

wherein A stands for a radical deriving from a diazo compound deriving from an amine of the benzene and naphthalene series, which dyestuffs are in dry state dark powders, easily soluble in water with a yellowish green to greenish blue coloration and which dye vegetable and mineral tanned leather in fast green shades.

4. The new green dyestuff of the formula:
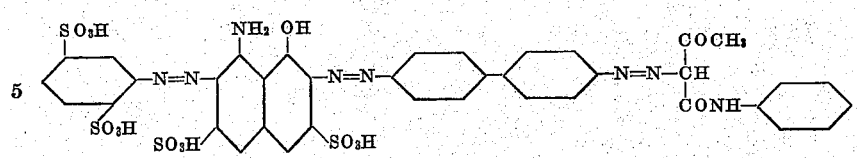
5. The new green dyestuff of the formula:
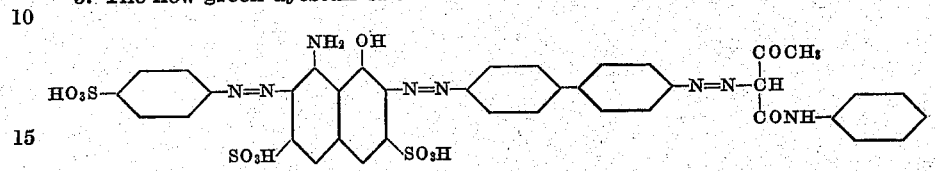
6. The new green dyestuff of the formula:
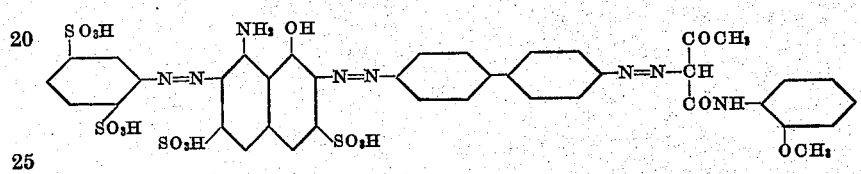
HEINRICH LIER.